United States Patent
Sugeno et al.

(10) Patent No.: US 8,564,685 B2
(45) Date of Patent: *Oct. 22, 2013

(54) VIDEO SIGNAL CAPTURING APPARATUS, SIGNAL PROCESSING AND CONTROL APPARATUS, AND VIDEO SIGNAL CAPTURING, VIDEO SIGNAL PROCESSING, AND TRANSFERRING SYSTEM AND METHOD

(75) Inventors: Kazuhiro Sugeno, Kanagawa (JP); Koji Kamiya, Kanagawa (JP); Motohiro Nakasuji, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,027

(22) Filed: Feb. 3, 2012

(65) Prior Publication Data

US 2012/0133792 A1 May 31, 2012

Related U.S. Application Data

(63) Continuation of application No. 11/461,882, filed on Aug. 2, 2006, now Pat. No. 8,125,532.

(30) Foreign Application Priority Data

Sep. 8, 2005 (JP) .................................. 2005-261066
Nov. 15, 2005 (JP) ................................ 2005-330533

(51) Int. Cl.
*H04N 5/228* (2006.01)
*H04N 11/04* (2006.01)
*G11B 5/02* (2006.01)

(52) U.S. Cl.
USPC ........................ 348/222.1; 348/388.1; 360/22

(58) Field of Classification Search
USPC .............. 348/222.1, 232, 388.1, 355; 386/68, 386/107
See application file for complete search history.

(56) References Cited

U.S. PATENT DOCUMENTS 5,555,020 A * 9/1996 Ishihara et al. ............ 348/221.1
7,176,966 B2 * 2/2007 Inoue et al. ................. 348/222.1

(Continued)

FOREIGN PATENT DOCUMENTS

EP 0 975 164 A2 1/2000
EP 1 014 706 A2 6/2000

(Continued)

OTHER PUBLICATIONS

Office Action issued Jan. 25, 2013 in European Patent Application No. 06018361.3.

(Continued)

*Primary Examiner* — Trung Diep
(74) *Attorney, Agent, or Firm* — Oblon, Spivak, McClelland, Maier & Neustadt, L.L.P.

(57) ABSTRACT

A video signal transfer system including an imaging apparatus for capturing an object to be imaged and generating a consecutive plurality of picture data forming a moving image, selecting from the plurality of picture data picture data positioned in advance at predetermined intervals to generate a plurality of lines (series) of video signals, and transmitting the plurality of systems of video signal, and a signal processing apparatus having a plurality of signal processing circuits, outputting the plurality of lines of video signals received from the imaging apparatus to the plurality of signal processing circuits, and making them process the signals in parallel.

3 Claims, 9 Drawing Sheets

(56) References Cited

U.S. PATENT DOCUMENTS

| | | | |
|---|---|---|---|
| 7,365,777 B2 * | 4/2008 | Saito | 348/222.1 |
| 7,468,754 B2 * | 12/2008 | Carlsgaard et al. | 348/448 |
| 7,916,185 B2 * | 3/2011 | Hatano et al. | 348/231.99 |
| 2006/0176951 A1 * | 8/2006 | Berman et al. | 375/240.01 |

FOREIGN PATENT DOCUMENTS

| | | |
|---|---|---|
| EP | 1 471 733 A1 | 10/2004 |
| JP | 10-23318 | 1/1998 |
| JP | 2000-48167 | 2/2000 |
| JP | 2000-188703 | 7/2000 |
| JP | 2005-39707 | 2/2005 |

OTHER PUBLICATIONS

Extended European Search Report issued Jul. 28, 2011, in European Patent Application No. 06018361.3.

"HDC-3300 HD Super Motion Color Camera," Sony Corporation, XP 55003356, 4 pages, Jul. 21, 2011.

"MAV-555 Series Multi-Access Video Disk Recorder," Sony Corporation, http://www.pmotions.com/Public/PDFs/Sony/MAV555.pdf, XP 55003362, pp. 1-21, Jan. 1, 2000.

* cited by examiner

FIG. 7D
CORRECTION
γ, Knee

PRIOR ART

FIG. 9A

SOURCE IMAGE

PRIOR ART

FIG. 9B

γ-CORRECTION
Knee-CORRECTION

PRIOR ART

FIG. 9C

ADDITION

VIDEO SIGNAL CAPTURING APPARATUS, SIGNAL PROCESSING AND CONTROL APPARATUS, AND VIDEO SIGNAL CAPTURING, VIDEO SIGNAL PROCESSING, AND TRANSFERRING SYSTEM AND METHOD

CROSS REFERENCES TO RELATED APPLICATION

This application is a continuation of U.S. application Ser. No. 11/461,882 filed Aug. 2, 2006, which contains subject matter related to Japanese Patent Application No. 2005-261066 filed in the Japan Patent Office on Sep. 8, 2005, and Japanese Patent Application No. 2005-330533 filed in the Japan Patent Office on Nov. 15, 2005, the entire contents of each of which are being incorporated herein by reference.

BACKGROUND OF THE INVENTION

1. Field of the Invention

The present invention relates to a video signal transfer system for transmitting video signals captured by a video camera for example to a later signal processing system and to an imaging apparatus, a signal processing apparatus, and a video signal transfer method used for that.

2. Description of the Related Art

For example, there is a video signal transfer system which performs high speed imaging at a high resolution by an imaging apparatus and transmits that video signal from the imaging apparatus to a signal processing apparatus.

Such a video signal transfer system performs control, in accordance with what speed the signal processing apparatus outputs the video signal, to transmit a video signal of that speed from the imaging apparatus to the signal processing apparatus.

Further, the imaging apparatus processes the video signal for gain control and auto alias level detection or other feedback processing, knee processing, and gamma correction. (refer to Japanese Patent Publication (A) No. 2000-188703).

Further, the signal processing apparatus serially processes the video signal captured at a high speed imaging for color correction etc.

However, in the above-mentioned video signal transfer system, since the speed of the video signal transmitted from the imaging apparatus to the signal processing apparatus is controlled in accordance with the speed of the video signal outputted by the signal processing apparatus, it suffers from the disadvantages that the amount of processing of the imaging apparatus is large, reduction of size is difficult, and the small size is complicated, and the power consumption is large.

Figure 9A:
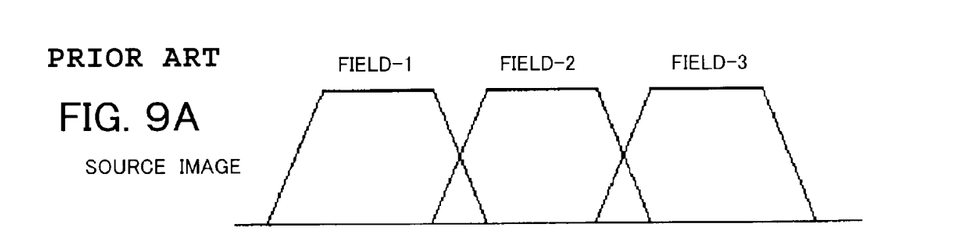
FIGS. 9A to 9C are diagrams for explaining the problem in a conventional signal transferring system.
Figure 9B:
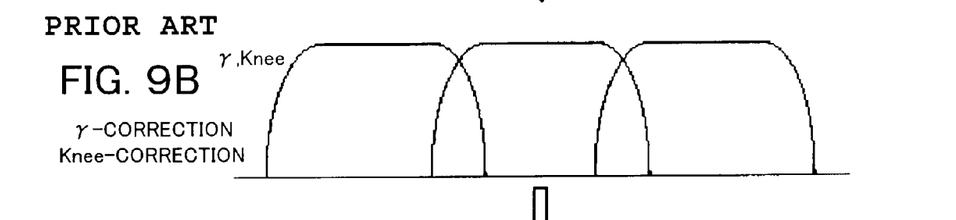
Figure 9C:
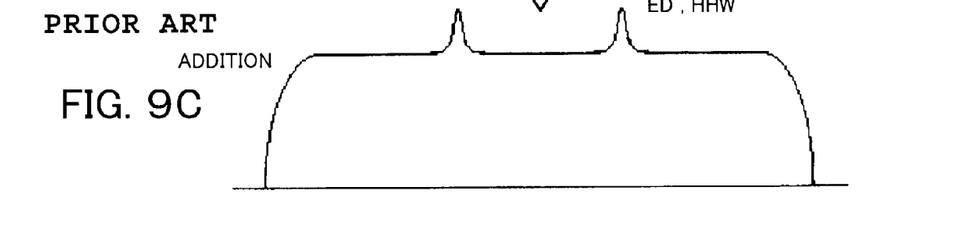

Further, the signal processing apparatus adds the plurality of video signals obtained by the high speed imaging to generates a standard speed video signals, but in this case, in the imaging apparatus, the video signals shown in FIG. 9A deform as shown in FIG. 9B due to the gamma processing and knee processing, so if combining these to generate a standard speed video signal, as shown in FIG. 9C, it suffers from the disadvantages that the standard speed video signal will suffer from unnatural edges or tones and the picture quality will become lower.

SUMMARY OF THE INVENTION

It is therefore desirable in the present invention to provide a video signal transfer system, imaging apparatus, signal processing apparatus, and video signal transfer method enabling reduction of the amount of processing of the imaging apparatus when transferring a video signal generated by the imaging apparatus to the signal processing apparatus.

It is also desirable in, the present invention to provide a video signal transfer system, imaging apparatus, signal processing apparatus, and video signal transfer method able to suppress a drop in quality of the video signal output by the above signal processing apparatus.

A video signal transfer system of a first aspect of the invention has an imaging apparatus for capturing an object to be imaged and generating a consecutive plurality of picture data forming a moving image, selecting from the plurality of picture data picture data positioned in advance at predetermined intervals to generate a plurality of lines (series) of video signals, and transmitting the plurality of lines of video signal, and a signal processing apparatus having a plurality of lines processing circuits, outputting the plurality of systems of video signals received from the imaging apparatus to the plurality of signal processing circuits, and making them process the signals in parallel.

An imaging apparatus of a second aspect of the invention is an imaging apparatus transmitting imaging results to a signal processing apparatus having an imaging unit for capturing an object to be imaged and generating a consecutive plurality of picture data forming a moving image, a signal processing circuit for selecting from the plurality of picture data generated by the imaging unit the picture data positioned at predetermined intervals in advance to generate a plurality of lines (series) of video signals, and a transfer circuit for transmitting the plurality of lines of video signals generated by the signal processing circuit to the signal processing apparatus.

A signal processing apparatus of a third aspect of the invention is a signal processing apparatus for processing a plurality of lines (series) of video signals received from an imaging apparatus capturing an object to be imaged to generate a consecutive plurality of picture data forming a moving image, selecting from the plurality of picture data the picture data positioned at predetermined intervals in advance to generate N ($\geq 2$) lines (series) of video signals, having N number of signal processing circuits, a separating unit for outputting the N systems of video signals received from the imaging apparatus to the N number of signal processing circuits and making them process the signals in parallel, and an external apparatus outputting 1/N picture time's worth of picture data of the N number of video signals input from the N number of the signal processing circuits in one picture time.

A video signal transfer method of a fourth aspect of the invention is a video signal transfer method transmitting imaging results of an imaging apparatus to a signal processing apparatus, having a first step of having the imaging apparatus configured to capture an object to be imaged and generate a consecutive plurality of picture data forming a moving image, a second step of having the imaging apparatus select from the plurality of picture data generated at the first step the picture data positioned at predetermined intervals in advance to generate a plurality of lines (series) of video signals and transmit the plurality of lines of video signals to the signal processing apparatus, and a third step of having the signal processing apparatus output the plurality of lines of video signals received from the imaging apparatus at the second step to the plurality of signal processing circuits and make them process the signals in parallel.

According to the present invention, it is achieved a video signal transfer system, imaging apparatus, signal processing apparatus, and video signal transfer method enabling reduction of the amount of processing of the imaging apparatus when transferring a video signal generated by an imaging apparatus to a signal processing system.

Further, the present invention can provide a video signal transfer system, imaging apparatus, signal processing apparatus, and video signal transfer method able to suppress a drop in quality of the video signal output by the above signal processing apparatus.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, the camera system according to embodiments of the present invention will be explained.

<First Embodiment>

First, the correspondence between the components of the present embodiment and the components of the present invention will be explained.

The video camera 10 is one example of an imaging apparatus of the present invention, and a camera control unit 12 is one example of a signal processing apparatus of the present invention.

Further, the field pictures or frame pictures of the present embodiment are examples of the picture data of the present invention.

Further, the video signals S34_1, S34_2, S34_3 of the present embodiment are examples of the plurality of lines (series) of video signals of the present invention.

Further, the signal processing circuits 43_1, 43_2, 43_3 of the present embodiment are examples of the plurality of signal processing circuits of the present invention.

Further, the buffer memory 32 is an example of the memory of the present invention, the viewfinder 33 is an example of the display of the present invention, and the signal processing circuit 34 is an example of the signal processing unit of the present invention.

Further, the preprocessing circuit 42 is an example of the separating unit of the present invention, and the addition circuit 71 is an example of the addition circuit of the present invention.

Figure 1:
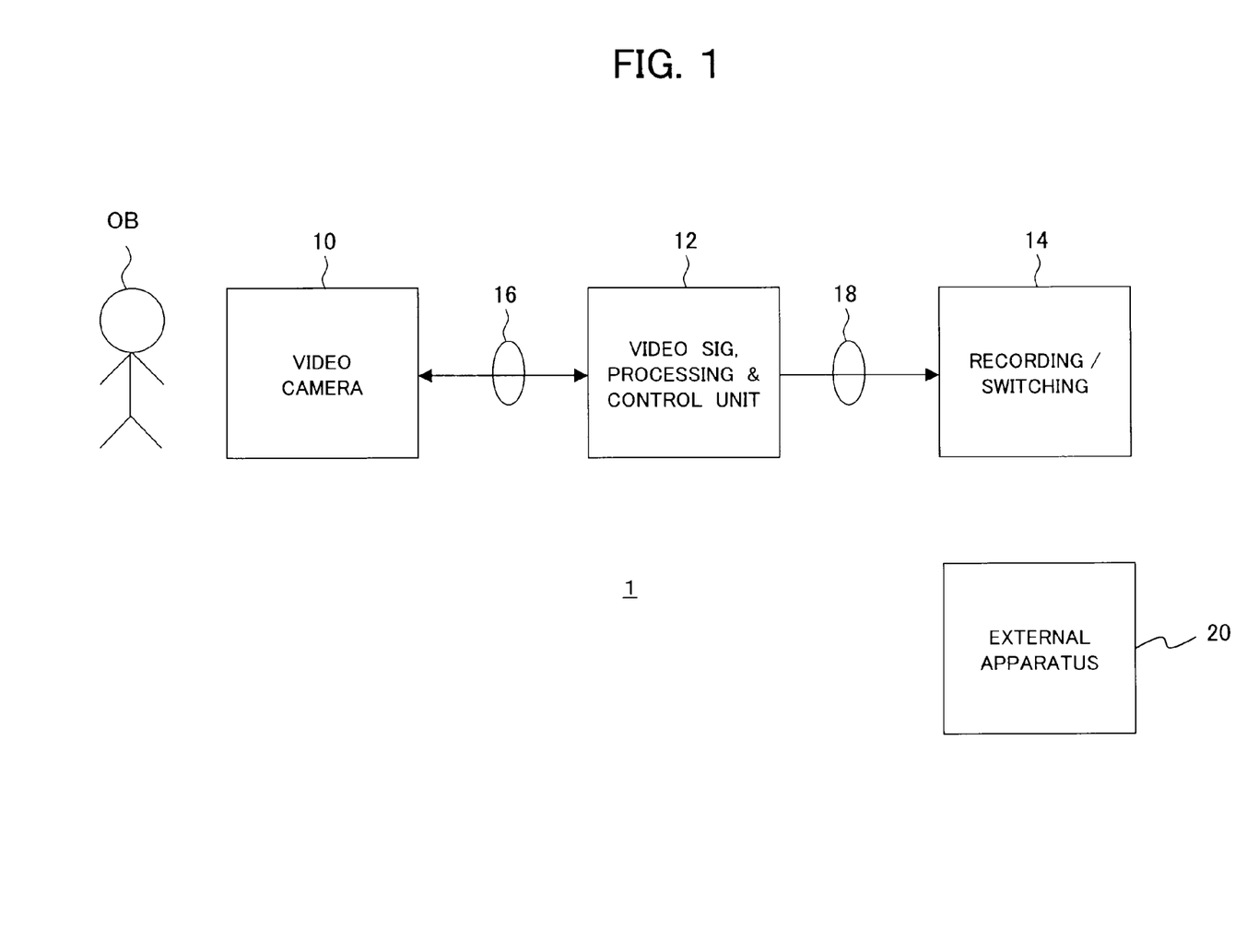
FIG. 1 is a view of the configuration of a video signal capturing, video signal processing, and transferring system of a first embodiment of the present invention.

FIG. 1 is a view of the overall configuration of a camera system 1 of the present embodiment.

As shown in FIG. 1, the camera system 1 has, for example, a video camera 10, camera control unit 12, and VTR or switcher (herein after VTR/switcher) 14. An external apparatus 20 is connected to the VTR/switcher 14.

The video camera 10 generates a video signal in accordance with the imaging results and outputs it through an optical fiber cable 16 to the control unit 12.

The camera control unit 12 processes the video signal inputted from the video camera 10 to generate an SDI (serial digital interface) type of video signal based on the SMPTE and outputs this through a cable 18 to the VTR/switcher 14.

The VTR/switcher 14 records or transmits the video signal inputted from the camera control unit 12.

The optical fiber cable 16, for example, is a composite optical fiber cable made up of optical fiber for transmitting and receiving and metacables for power line and control use.

In the camera system 1, for example, the video camera 10 is arranged in a studio, and the camera control unit 12 and VTR/switcher 14 are arranged in a secondary adjustment room.

Due to this, when recording a program by the video camera 10 in the studio, this video signal and audio signal are outputted through the optical fiber cable 16 to the camera control unit 12 of the secondary adjustment room.

Further, the processed video signal and audio signal from the camera control unit 12 is outputted through the cable 18 to the VTR/switcher 14.

Further, the VTR/switcher 14 performs signal processing for recording, editing, and transmitting the video signal and audio signal.

Below, the video camera 10 and camera control unit 12 will be explained in detail.

Figure 2:
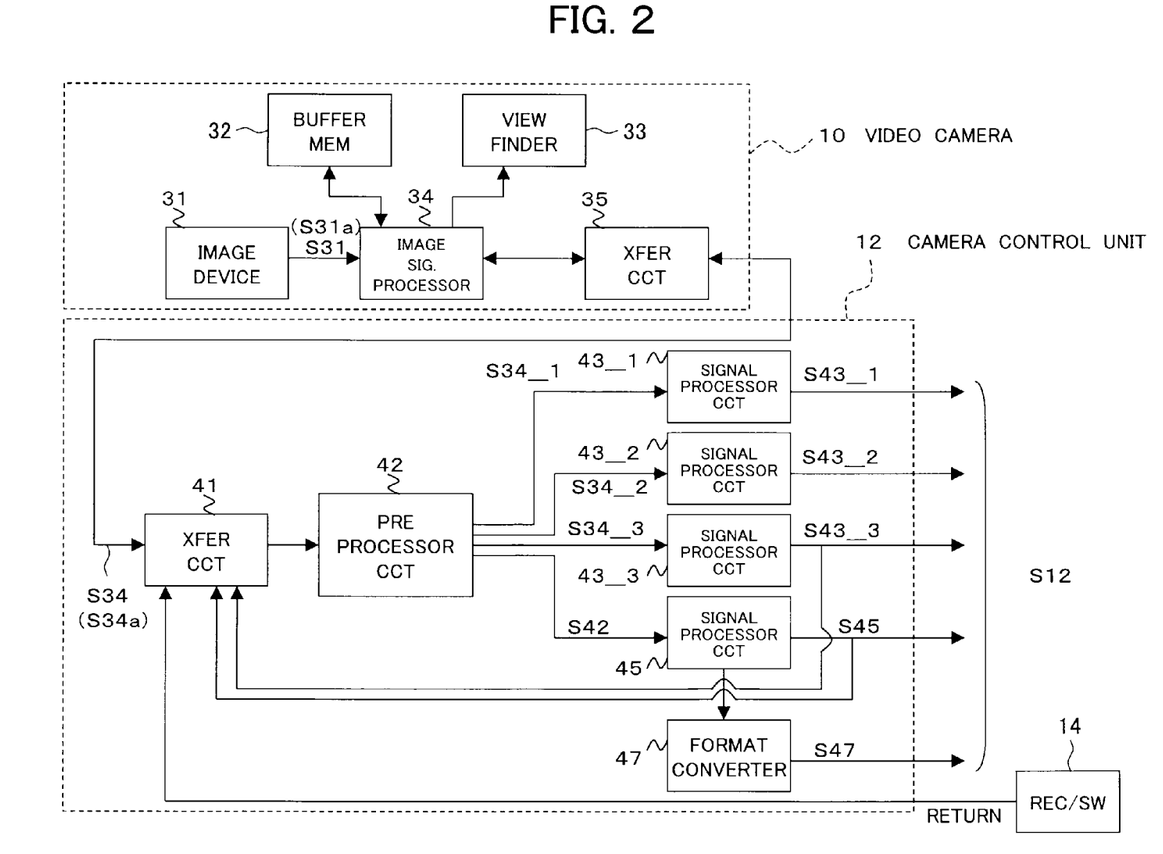
FIG. 2 is a view of the configuration of a video camera and a video signal processing and control unit shown in FIG. 1.

FIG. 2 is a view of the configuration of the video camera 10 and the camera control unit 12.

[Video Camera 10]

The video camera 10, as shown in FIG. 2, has, for example, an imaging device 31, buffer memory 32, viewfinder 33, signal processing circuit 34, and transfer circuit 35.

The imaging device 31 is, for example, a CMOS (Complementary Metal Oxide Semiconductor), CCD (Charge-Coupled Device), or other imaging device and outputs a video signal 31 in accordance with the imaging results to the signal processing circuit 34.

The imaging device 31, for example, performs high speed imaging at 3× (three times worth) speed of the standard (normal) speed and generates an interlace format video signal S31.

Note that light is focused on the imaging device 31 adjusted by a focusing mechanism. Further, the imaging results of the imaging device 31 are output as the video signal S31 after gain control.

The buffer memory 32 stores the video signal processed in the signal processing circuit 34.

The viewfinder 33 reads out and displays the video signal S31 stored in the buffer memory 32 under the control of the signal processing circuit 34.

Figure 3:
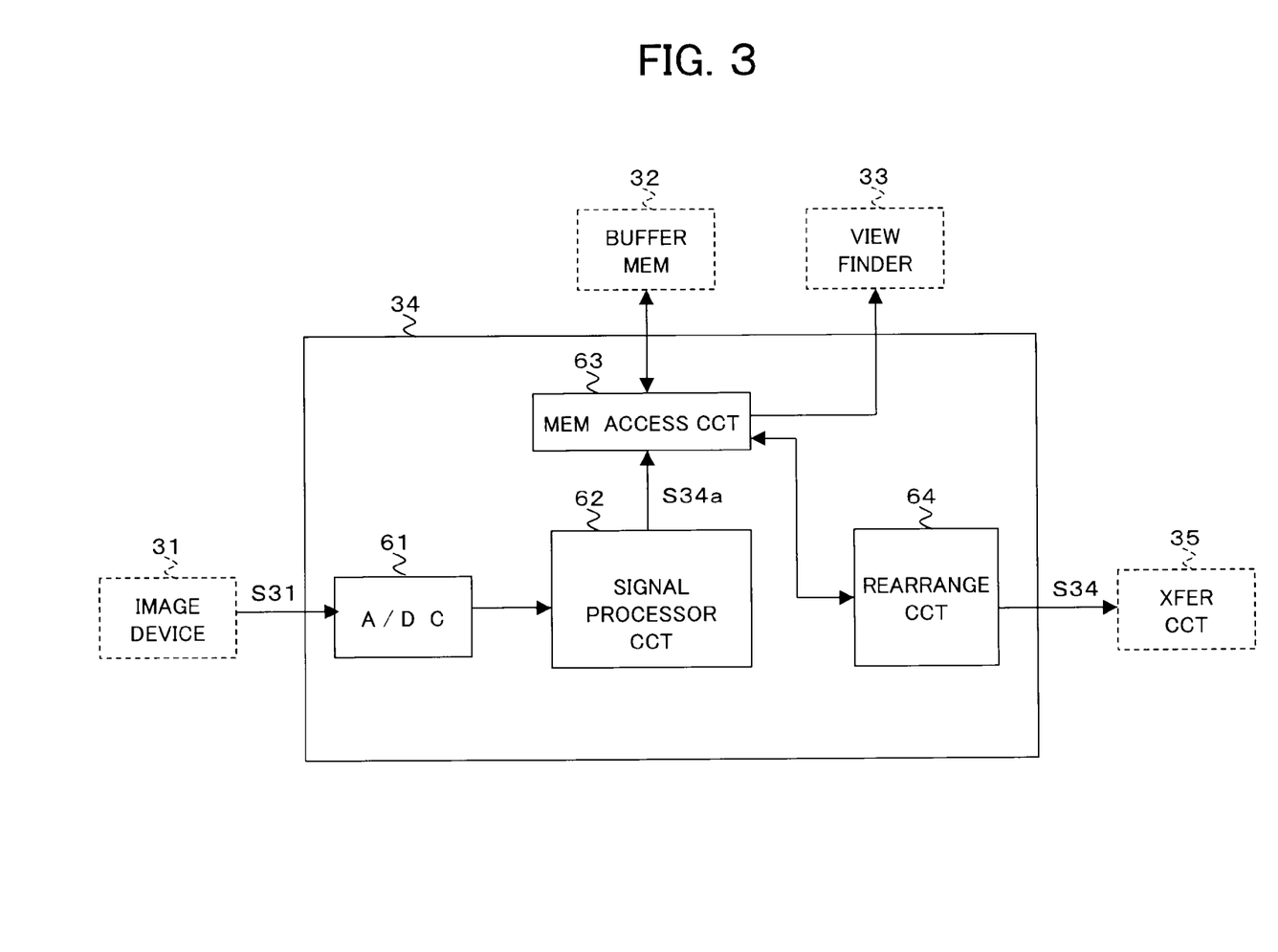
FIG. 3 is a diagram showing the configuration of an image signal processor circuit in the video camera shown in FIG. 2.

FIG. 3 is a view of the configuration of the signal processing circuit shown in FIG. 2.

As shown in FIG. 3, the signal processing circuit 34 has, for example, an A/D conversion circuit 61, signal processing circuit 62, memory access circuit 63, and rearrangement circuit 64.

The A/D conversion circuit 61 converts an analog video signal S31 inputted from the imaging device 31 to a digital video signal and outputs it to the signal processing circuit 62.

The signal processing circuit 62 processes the digital video signal inputted from the A/D conversion circuit 61 relating to feedback control so as to generate the video signal S34a and outputs it to the memory access circuit 63. The memory access circuit 63 writes the video signal S34a in the buffer memory 32.

In the present embodiment, the signal processing relating to the above feedback control, for example, includes gain control processing and auto alias level detection processing etc.

The memory access circuit 63 writes the video signal S34a inputted from the signal processing circuit 62 in the buffer memory 32.

Further, the memory access circuit 63 reads out one of the fields for each consecutive 3 fields in the video signal S34a from the buffer memory 32 and outputs it to the viewfinder 33.

The rearrangement circuit 64 receives as input the video signal S34a read by the memory access circuit 63 from the buffer memory 32. When the video signal S31 is of an interlace format, it rearranges the video signal S34a, as shown in FIG. 4, so that the former 3 fields 1T, 1B, 2T of 6 fields forming one group match in time (become parallel) and outputs them as the video signal S34 to the transfer circuit 35.

Figure 4A:
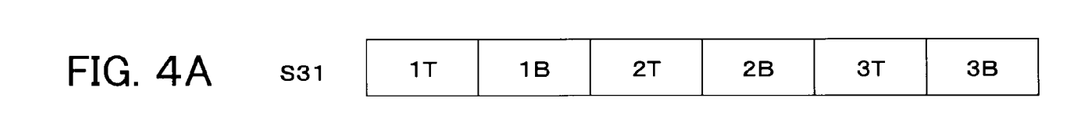
FIGS. 4A to 4B are diagrams showing the image signal transferred by the image signal processor circuit shown in FIG. 3.
Figure 4B:
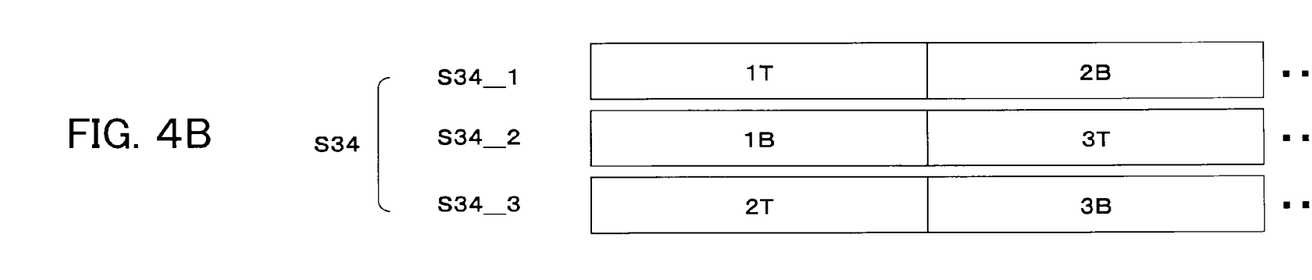

In FIG. 4, "T" indicates a top field, and "B" indicates a bottom field.

Further, the rearrangement circuit 64, as shown in FIG. 4, rearranges, after the above former 3 fields 1T, 1B, 2T, the latter 3 fields 2B, 3T, and 3B of the above 6 fields so as to match in time (become parallel) and outputs them as the video signal S34 to the transfer circuit 35.

That is, the rearrangement circuit 64, as shown in FIG. 4B, generates a video signal comprised of three lines (series) of video signals S34_1, S34_2, S34_3.

In the camera system 1, by the signal processing circuit 34 of the video camera 10 rearranging field pictures in groups of 6 field pictures as explained using FIG. 4, the latter camera control unit 12 can realize the processing for adding the 3× speed captured field pictures and displaying of a standard speed image by a simple addition circuit.

The transfer circuit 35 transmits the video signal S34 inputted from the rearrangement circuit 64 in parallel or by time division through the optical fiber cable 16 to the camera control unit 12.

For example, the transfer circuit 35 transmits one 10.692 GHz video signal S34 comprised of R, G, B 12-bit signals mapped to a serial signal to the optical fiber cable 16.

Further, in the case of 3× (three times worth) speed transmission, the transfer circuit 35 may transmit the video signal S34 as six 1.485 GHz serial SDI signals through a BNC cable to the control unit 12. Note that the 3× speed (three times worth speed to a normal speed) is an example. The present embodiment may also be applied to high speed transfer (N× (N times worth) speed transmission) other than 3× speed.

As explained above, the video camera 10 transmits the video signal S34 of the format shown in FIG. 4 to the camera control unit 12 regardless of the speed of the video signal S12 outputted by the camera control unit.

Further, in camera system 1, as explained above, the video signal is processed relating to feedback control, but Knee processing or gamma correction processing or other predetermined processing for improvement of quality, compression, etc. are not performed.

Due to this, the processing load of the video camera 10 can be reduced more than before.

[Camera Control Unit 12]

The camera control unit 12 has, as shown in FIG. 2, a transfer circuit 41, preprocessing circuit 42, signal processing circuit 43_1, 43_2, 43_3, 45, and format conversion circuit 47.

The transfer circuit 41 performs reverse format conversion from the transfer circuit 35 on the video signal S34 received through the optical fiber cable 16 from the video camera 10 and outputs the result to the preprocessing circuit 42.

Figure 5:
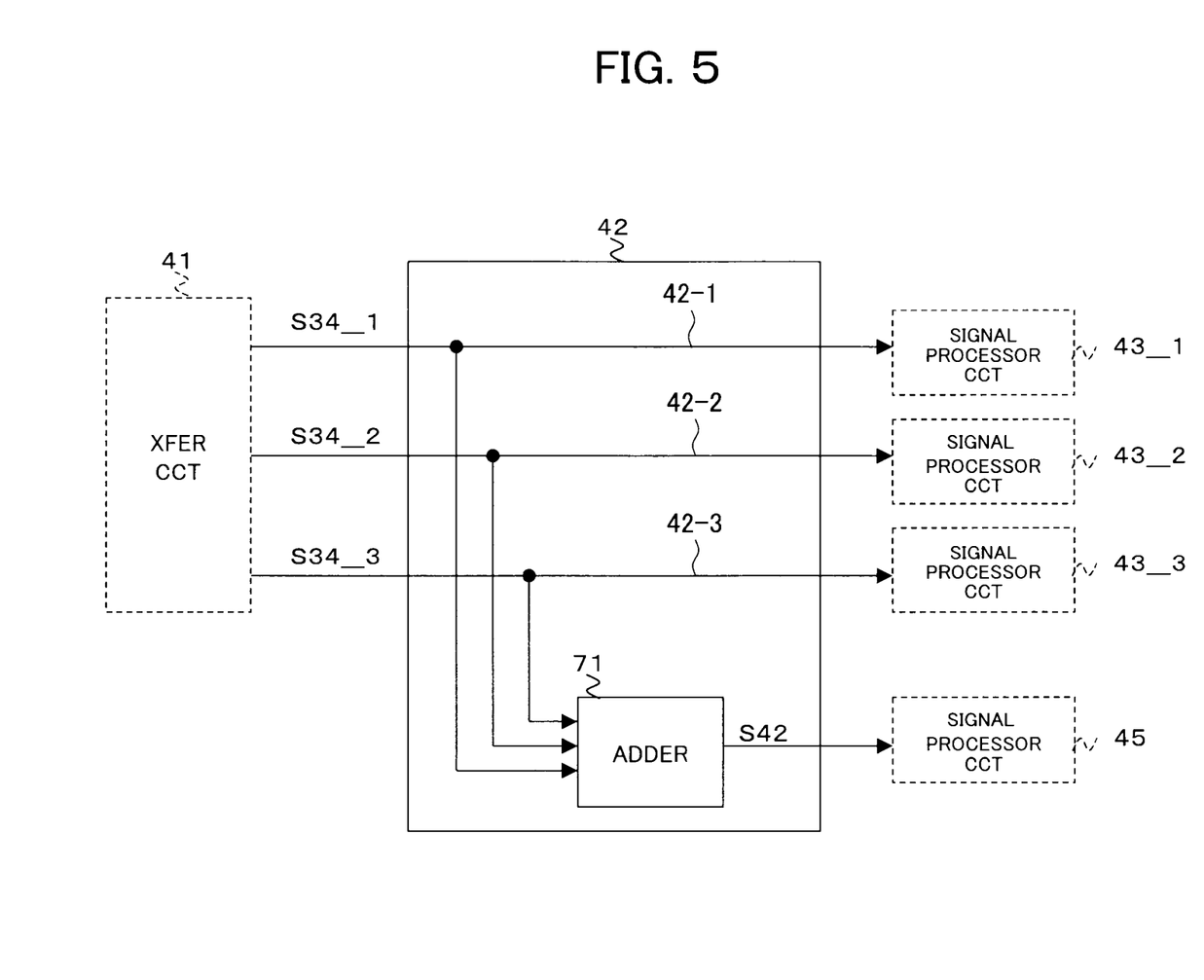
FIG. 5 is a diagram showing the configuration of a normal speed image signal generator circuit shown in FIG. 2.

FIG. 5 is a view of the configuration of the preprocessing circuit 42 as shown in FIG. 2.

The preprocessing circuit 42, as shown in FIG. 5, outputs the video signals S34_1, S34_2, S34_3 forming the video signal S34 inputted from the transfer circuit 41 to the signal processing circuits 43_1, 43_2, 43_3.

Further, the preprocessing circuit 42, as shown in FIG. 5, is provided with an addition circuit 71.

The addition circuit 71 adds the video signals S34_1, S34_2, S34_3 forming the video signal S34 inputted from the transfer circuit 41 to generate the standard speed video signal S42 and outputs it to the signal processing circuit 45.

In the present embodiment, the video signal S34, as shown in FIG. 4(B), includes three lines (series) of video signals S34_1, S34_2, S34_3 stored in parallel, so there is no need to provide a memory for storing a large amounts of video signals before addition by the addition circuit 71.

The signal processing circuits 43_1, 43_2, 43_3 process the video signals S34_1, S34_2, S34_3 for predetermined improvement of the quality, compression, etc. so as to generate the video signals S43_1, S43_2, S43 and outputs these as the video signal S12 to the VTR/switcher shown in FIG. 1.

The above signal processing performed by the signal processing circuits 43_1, 43_2, 43_3 include, for example, Knee processing (processing to compress multi-bits of pixel data to reduce load of color processing), gamma correction functions (processing to maximize input value to ideal output value in order to give vivid color), detail processing, etc.

Further, the signal processing circuits 43_1, 43_2, 43_3, for example, when reading out and replaying video signals stored in the VTR/switcher 14, perform processing to expand the read compressed video signals. The expanded video signals are outputted through the transfer circuit 41 to the video camera 10.

The signal processing circuit 45 processes the standard speed video signal imputed from the preprocessing circuit 42 for predetermined improvement of quality, compression, etc. to generate the video signal S45 and outputs this as the video signal S12 to the VTR/switcher shown in FIG. 1.

The format conversion circuit 47 receives as input the video signal S45 from the signal processing circuit 45, converts it to a video signal 47 of a predetermined format, and outputs it as the video signal S12 to the VTR/switcher 14 shown in FIG. 1. This conversion, for example, is conversion that down converts an HD (High Definition) video signal to an SD (Standard Definition) video signal (NTSC system etc.).

[VTR/Switcher 14]

Figure 6A:
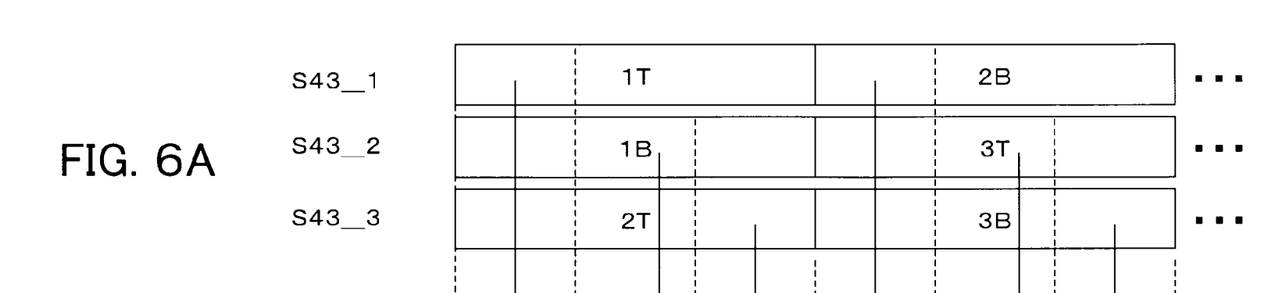
FIGS. 6A to 6C are diagrams for explaining a switching operation of the video signal processing and control unit shown in FIG. 2.
Figure 6B:
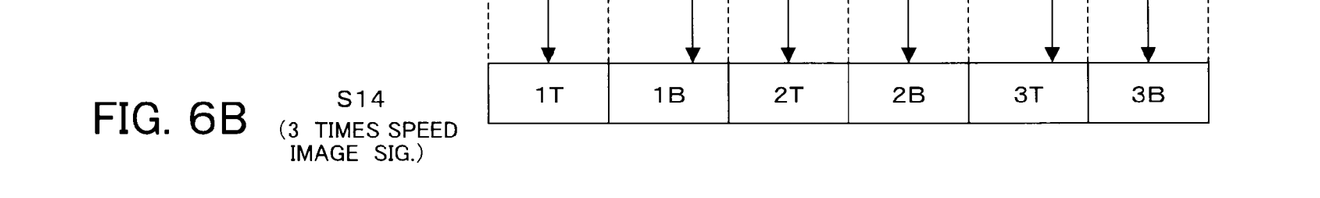

The VTR/switcher 14, in the case of 3× speed video output, as shown in FIG. 6(B), switches the video signals S43_1, S43_2, S43_3 inputted from the signal processing circuits 43_1, 43_2, 43_3 and outputs the 3× speed video signal S14.

Figure 6C:
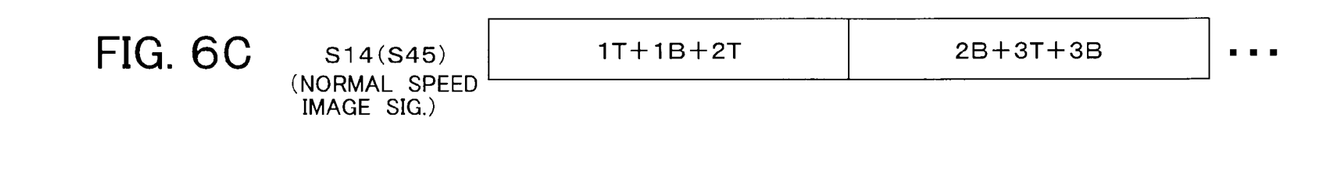

On the other hand, the switch 48, in the case of standard speed video output, as shown in FIG. 6(C), outputs the video signal S45, obtained by adding the video signals S43_1, S43_2, S43_3 inputted from the signal processing circuit, as the standard speed video signal S14.

In this way, the camera control unit 12 can output the 3× speed or standard speed video signal S14 by just processing for switching the video signals S14 inputted from the camera control unit 12.

Further, the VTR/switcher 14, for example, also has the function of writing the video signal S12 inputted from the camera control unit 12 on to a disk or other recording unit and rearranging it for output when reading it.

Below, an example of the operation of the camera system 1 of the present embodiment will be explained.

First, the imaging device of the video camera 10 generates a video signal S31 in accordance with the imaging results of the imaging subject.

Next, the A/D conversion circuit 61 of the signal processing circuit 34 shown in FIG. 3 converts the video signal S31 to a digital format and writes the processed video signal S31a through the memory access circuit 63 in the buffer memory 32.

Next, the rearrangement circuit 64 receives as input the video signal S34a read from the buffer memory 32 through the memory access circuit 63. When the video signal S31 is of an interlace format, it rearranges the video signal S34a, as shown in FIG. 4, so that the former 3 field pictures 1T, 1B, 2T of the 6 fields forming a group match in time (become parallel) and outputs them as the video signal S34 comprised of the three lines of standard speed video signals S34_1, S34_2, S34_3.

The transfer circuit 35 transmits the video signal S34 inputted from the rearrangement circuit 64 in parallel or by time division through the optical fiber cable 16 to the camera control unit 12.

The transfer circuit 41 of the camera control unit 12 performs reverse format conversion from the transfer circuit 35 on the video signal S34 received through the optical fiber cable 16 from the video camera 10 and outputs the result to the preprocessing circuit 42.

Next, the preprocessing circuit 42 of the camera control unit 12, as shown in FIG. 5, outputs the video signals S34_1, S34_2, S34_3 forming the video signal S34 inputted from the transfer circuit 41 to the signal processing circuits 43_1, 43_2, 43_3.

Further, the addition circuit 71 adds the video signals S34_1, S34_2, S34_3 forming the video signal S34 inputted from the transfer circuit to generate the standard speed video signal S42 and outputs it to the signal processing circuit 45.

Further, the signal processing circuits 43_1, 43_2, 43_3 process the video signals S34_1, S34_2, S34_3 for predetermined improvement of quality, compression, etc. to generate the video signals S43_1, S43_2, S43_3 and outputs them as the video signal S12 to the VTR/switcher 14.

In parallel with this, the signal processing circuit 45 has processes the standard speed video signal inputted from the preprocessing circuit 42 for predetermined improvement of quality, compression, etc. to generate the video signal S45 and outputs it as the video signal S12 to the VTR/switcher 14.

Next, the VTR/switcher 14, in the case of 3× speed video output, as shown in FIG. 6B, switches from the video signals S43_1, S43_2, S43_3 inputted from the signal processing circuits 43_1, 43_2, 43_3 and outputs the 3× speed video signal S_14.

On the other hand, the VTR/switcher 14, in the case of standard speed video output, as shown in FIG. 6C, outputs the video signal S45, obtained by adding the video signals S43_1, S43_2, S43_3 inputted from the signal processing circuit, as the standard speed video signal S14.

As explained above, in the camera system 1, as shown in FIG. 4, the rearrangement circuit 64 of the video camera 10 shown in FIG. 3 generates three systems of 1× speed video signals S34_1, S34_2, S34_3 from the video signal S31 captured at 3× speed shown in FIG. 4A and transmits it to the camera control unit 12 in accordance with their timings.

Further, the camera control unit 12 performs parallel processing on the video signals S34_1, S34_2, S34_3 received from the video camera 10 at the signal processing circuits 43_1, 43_2, 43_3 shown in FIG. 2.

Due to this, the camera control unit 12 can process a video signal captured at 3× speed in a short time.

Further, in the camera system 1, the signal processing circuit 62 of the video camera 10 shown in FIG. 3 processes the digital video signal inputted from the A/D conversion circuit 61 for gain control, auto alias level detection, or other feedback control.

Further, the signal processing circuits 43_1, 43_2, 43_3 of the camera control unit 12 process the video signals S34_1, S34_2, S34_3 for Knee processing, gamma correction, or other predetermined improvement of quality, compression, etc.

Figure 7A:
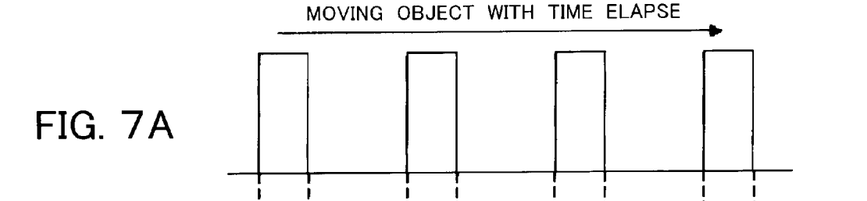
FIGS. 7A to 7D are diagrams showing processing results of the image signal according to a first embodiment of the present invention.
Figure 7B:
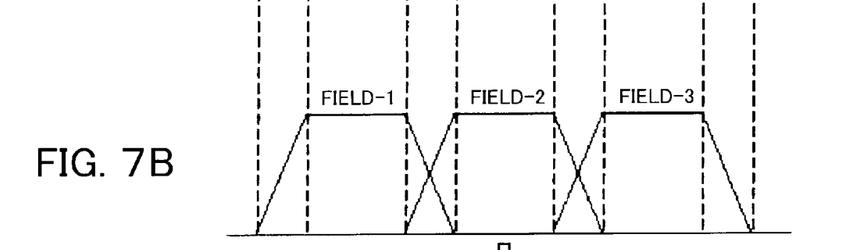
Figure 7C:
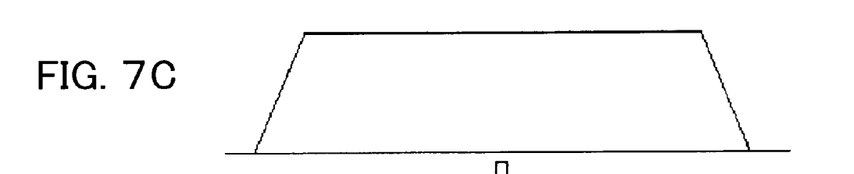
Figure 7D:
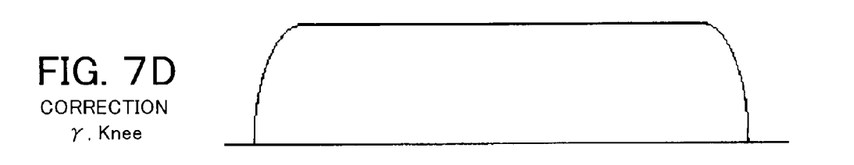

Due to this, for example, when the addition circuit 71 of the preprocessing circuit 42 shown in FIG. 5 adds the three systems of video signals to generate a standard speed video signal, as shown in FIGS. 7B and 7C, it can add them in a state without image processing and can therefore avoid a drop in quality as explained with reference to FIG. 9.

Further, in the camera system 1, the image processing for improvement of quality is not performed by the video camera 10, but by the camera control unit 12, so the amount of processing and power consumption of the video camera 10 can be reduced. This effect is particularly remarkable in the case of using, as a video signal, an HD signal with several times larger an amount of data than SD.

In the camera system 1, the video camera 10 temporarily stores the picture data generated at the imaging device 31 in the buffer memory 32, then reads it out and displays the image on the viewfinder 33. For this reason, even when no communication link is established between the video camera 10 and the camera control unit 12, it is still possible to display a captured image on the viewfinder 33. Due to this, the system setup can be made more efficient.

Further, the viewfinder 33 can display an image with almost no delay and can track and display an image of an object moving at a high speed.

In the camera system 1, it is possible to change the speed of the video signal S14 in the VTR/switcher 14 without changing the capture speed of the imaging device 31. Due to this, operation control of the imaging device 31 becomes simple.

In the camera system 1, the video camera 10 generates three lines of standard speed video signals S34_1, S34_2, S34_3 from the high speed captured video signal S31 and transmits them to the camera control unit 12. Further, the camera control unit 12 processes the three lines of standard speed video signals S34_1, S34_2, S34_3 at the signal processing circuits 43_1, 43_2, 43_3 in parallel, then switches and outputs the results so as to output a 3× speed video signal.

Due to this, the video signals S34_1, S34_2, S34_3 can be constantly processed at standard speed, and the circuit configuration can be made simple and inexpensive.

Further, in the camera system 1, the video camera 10 generates three lines of standard speed video signals S34_1, S34_2, S34_3, so the camera control unit 12 does not need to be provided with a large scale memory. The effect is particularly remarkable in cases where, as the video signal, an HD image with several times the amount of data compared with the SD is used. Further, in the camera system 1, common signal processing circuits can be used as the signal processing circuits 43_1, 43_2, 43_3, so even if the image capture speed is increased to 3× (three times) or more, this can be handled by just increasing the same signal processing circuits.

Further, in the camera system 1, the video signal transmitted from the video camera 10 to the camera control unit 12 is not compressed, so high quality video output is possible.

Further, in the camera system 1, a standard speed video signal is generated by addition before camera signal processing by the signal processing circuit 45, so it is possible to output high quality video as standard speed video. In this way, because the standard speed video is high quality, usage as a standard speed imaging camera and not just as a high speed imaging camera is possible.

In the past, high speed video and standard speed video can be outputted at the same time, so it is possible to combine the two separate lines required for high speed imaging and standard speed imaging into one.

Further, in the camera system 1, because there are a plurality of return systems (paths), the types of signals that can be taken by the camera are increased and flexible application as a system is possible.

Further, the processed signal to be displayed on the viewfinder 33 may be selected from one with an added natural dynamic resolution feel or a high speed video with a shutter effect, so the optimal video (picture) can be displayed on the viewfinder 33 in accordance with the objective.

Further, the video signal returning from the camera control unit 12 to the video camera 10 for display on the viewfinder 33 may be selected from one system of processed high speed output with a shutter effect or added standard speed video with natural motion.

In addition to this, as an independent return system is located in the video camera 10, it is possible to obtain a video signal, other than the video signal displayed on the viewfinder 33, from the output terminal provided at the camera at the same time as displaying the video of the camera video returned from the camera control unit 12.

<Second Embodiment>

Figure 8A:
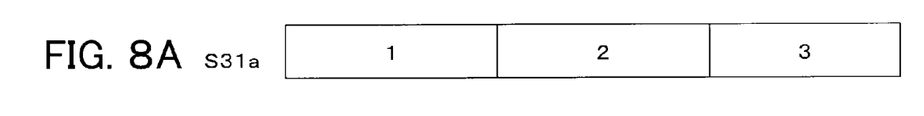
FIGS. 8A to 8B are diagrams for explaining the image signal according to a second embodiment of the present invention.

In the above-mentioned first embodiment, a case was illustrated where the imaging device 31 generated a video signal 31*a* of an interlaced format, however, in the present embodiment, as shown in FIG. 8A, the imaging device 31*a* generates a video signal S31*a* of a progressive format.

Figure 8B:
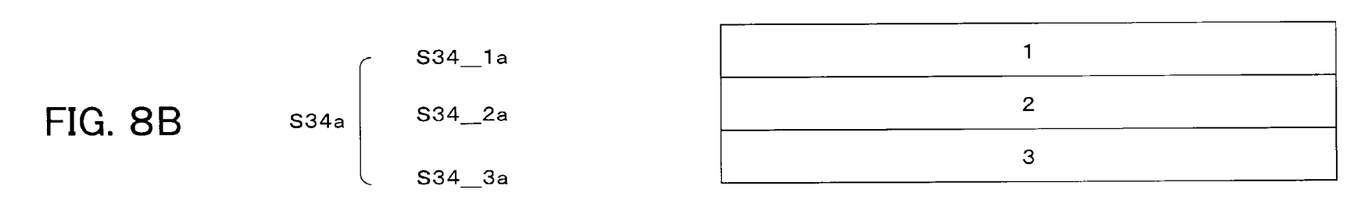

In this case, the rearrangement circuit 64, as shown in FIG. 8B, assigns consecutive frames (for example, "1", "2", "3") in groups of three frames to the plurality of different video signals S34_1*a*, S34_2*a*, S34_3*a*.

In this way, when the imaging device 31 generates a video signal S31*a* of a progressive format, effects similar to the case of the first embodiment can be obtained.

The present invention is not limited to the above embodiments.

Namely, those skilled in the art can perform a variety of modifications, combinations, sub-combinations, and substitutions concerning the components of the embodiments mentioned above within the technical range of the present invention or equivalent range to that.

For example, in the above embodiments, a case was illustrated where "N" is "3" for the present invention, however, it is possible to apply the present invention in a situation of 2 or more.

Further, in the above embodiments, a case was illustrated where only feedback processing was performed in the video camera 10, however, even in cases where gamma correction and Knee processing etc., are performed in the video camera 10, since the processing of the video camera does not need to be altered in accordance with the speed of the video signal outputted from the camera control unit 12, the effect of enabling the video camera 10 to be realized by a simple configuration can be obtained.

What is claimed is:

1. A video signal transfer system comprising:
    an imaging apparatus that:
        captures an object to be imaged and generates a consecutive plurality of picture data forming a moving image,
        selects from the plurality of picture data positioned in advance at predetermined intervals to generate a plurality of lines of video signals, and
        transmits the plurality of lines of video signals in parallel; and
    a signal processing apparatus having a plurality of signal processing circuits that outputs the plurality of lines of video signals received from the imaging apparatus to the plurality of signal processing circuits, and processes the signals in parallel.

2. The video signal transferring apparatus of claim 1, wherein the imaging apparatus generates N (N>2) lines of the video signals, stores N number of consecutive picture data forming the moving image in a different line of a video signal, controls the N number of consecutive picture data so as to transmit them in parallel, and transmits the plurality of lines of video signals at 1/N speed of the image capture speed.

3. A video signal transfer system comprising:
    capturing means for capturing an object to be imaged;
    generating means for generating a consecutive plurality of picture data forming a moving image;
    selecting means for selecting from the plurality of picture data picture data positioned in advance at predetermined intervals to generate a plurality of lines of video signals;
    transmitting means for transmitting the plurality of lines of video signals in parallel; and
    signal processing means for outputting the plurality of lines of video signals received from the imaging apparatus to a plurality of signal processing circuits, and processing the signals in parallel.

* * * * *